United States Patent [19]

Yokota

[11] Patent Number: 5,016,941
[45] Date of Patent: May 21, 1991

[54] STRUCTURE OF VEHICLE SEAT

[75] Inventor: Masaaki Yokota, Akishima, Japan

[73] Assignee: Tachi-S Co. Ltd., Tokyo, Japan

[21] Appl. No.: 492,673

[22] Filed: Mar. 13, 1990

[51] Int. Cl.$^5$ .............................................. A47C 7/18
[52] U.S. Cl. ............................ 297/452; 297/DIG. 1; 297/219
[58] Field of Search ............... 297/452, 218, 458, 459, 297/219, DIG. 1

[56]  References Cited

U.S. PATENT DOCUMENTS

| | | | |
|---|---|---|---|
| 3,630,572 | 12/1971 | Homier | 297/219 X |
| 3,675,970 | 7/1972 | Bereday | 297/452 |
| 4,534,595 | 8/1985 | Abe et al. | 297/452 |
| 4,606,580 | 8/1986 | Yoshizawa | 297/DIG. 1 X |
| 4,609,226 | 9/1986 | Yoshizawa | 297/452 |
| 4,627,664 | 12/1986 | Okazaki et al. | 297/457 |
| 4,699,427 | 10/1987 | Kobayashi | 297/DIG. 1 X |
| 4,740,035 | 4/1988 | Kazaoka et al. | 297/452 |
| 4,747,638 | 5/1988 | Saito | 297/DIG. 1 X |
| 4,865,379 | 9/1989 | Aoki et al. | 297/DIG. 1 X |

FOREIGN PATENT DOCUMENTS 2023803 12/1971 Fed. Rep. of Germany ...... 297/452

Primary Examiner—Jose V. Chen
Attorney, Agent, or Firm—Oldham & Oldham Co.

[57]  ABSTRACT

A structure of a vehicle seat, wherein the seat is formed by a trim cover assembly and a foam padding covered therewith, the trim cover assembly being composed of an animal-leather surface covering layer, a wadding and a wadding cover. While the animal-leather surface covering layer is merely placed on the foam wadding without any adhesive, the wadding cover is bonded to the uneven surface of the foam padding by an adhesive, with the surface covering layer sewn with the foam wadding and wadding cover, to thereby avoid creation of wrinkles and appearing of the back skin rough creases on the outer surface of the trim cover assembly.

6 Claims, 2 Drawing Sheets

STRUCTURE OF VEHICLE SEAT

BACKGROUND OF THE INVENTION

1. Field of the Invention

The present invention relates to a vehicle seat such as one used for an automobile, and particularly is concerned with the structure of a vehicle seat wherein the seat is composed of a trim cover assembly having a surface covering layer of an animal leather, a foam wadding and a wadding cover, and of a foam padding having an uneven outer surface conforming in shape to a contour of the seat.

2. Description of Prior Art

FIGS. 1 and 2 shows a conventional seat cushion (SC') of and automotive seat of this sort covered with a trim cover assembly (a') including an animal leather surface covering layer. As shown in FIG. 1, the trim cover assembly (a') is so formed as to define therein a central seating section (a'1), a pair of side bolster sections (a'2) and a side peripheral wall section (a'3). The two side bolster sections (a'2) are shown as being raised or upwardly projected in relation to the central seating section (a'1). The trim cover assembly (a') comprises the animal leather surface covering layer (1'), a foam padding layer (2') and wadding cover (3'), in which it is a common knowledge in this technical field that the leather-made surface (1') should not be bonded by adhesive to an underlayer because the application of the adhesive to the rough reverse surface of the animal leather will produce and undesired, objectionable texture and creases on the upper surface of the same, and such surface covering layer (1') is merely laid on the wadding layer (2') without bonding therebetween, while on the other hand, the wadding layer (2') is bonded to the wadding cover (3').

As seen from FIG. 2, there is provided a foam padding (b') which is foamed in a mold into a predetermined configuration conforming to a given contour of the seat back (SC'). The foam padding (b') has a seat cushion frame (4') mounted therein. The shown longitudinal section of the padding (b') has a recessed area (b'1) at a point supporting the buttocks of an occupant thereon.

Such padding (b') is covered with the trim cover assembly (a') such that the terminal ends of the latter are fixedly anchored by hog rings (h) to the lower end of the seat cushion frame (4'), thus stretching taut the trim cover assembly (a') over the padding (b)).

However, as shown in FIG. 2, the fact that the surface covering layer (1') is not bonded along the the uneven surface of the padding (b') results in the part of the covering layer (1'), which lies at the rearward area (a'1-1) of the trim cover assembly (a), being separated from the wadding (2), due to the central seating section (a1) being pulled irregularly by the integral, continuous side bolster sections (a'2), as the consequence of which, plural objectional wrinkles or creases are created on the surface of the seat cushion (SC'). Additionally, as pointed out above, the direct bonding of the animal leather covering layer (1') to the wadding (2') has not been an answer to solving this problem because of the grotesque textured reverse skin side of the covering layer (1') appearing as it is on its outer surface, impairing badly the aesthetic appearance of the seat cushion (SC').

SUMMARY OF THE INVENTION

To alleviate the above drawback, the present invention has for its purpose the provision of an improved structure of a vehicle seat which presents a smooth surface of the trim cover assembly using an animal leather surface layer, without any creating of objectional creases and back-skin texture patterns thereon.

In accomplishment of such purpose, in accordance with the present invention, the trim cover assembly includes an animal-leather surface covering layer not bonded to a padding thereunder, with a padding cover being only bonded to the outer surfaces of a foam padding. In this respect, the trim cover assembly is formed in a configuration conforming to that of the foam padding, having a central seating section corresponding to the central seating part of the foam padding. The central seating section of the trim cover assembly includes at least two separate base sections which are sewn together in such a manner that the resulting sewn central coating section lies upon and along the central seating part of the foam padding. The central seating section of the trim cover assembly is sewn with peripheral sections of the same assembly corresponding to the other parts of the foam padding.

Accordingly, the animal-leather surface covering layer is placed upon the wadding without being bonded to the wadding. The wadding cover is bonded integrally to the upper surface of the foam padding where it has the central seating part where there is no creation of objectionable creases and grotesque textured patterns of its rear skin side appearing on its outer surface.

It is the main object of the present invention to provide a vehicle seat which has a smooth surface using an animal leather surface layer without any creases.

It is another object of the present invention to attach an animal layer to a padding without the animal layer being bonded to the padding.

It is yet another object of the present invention to provide a pleasingly aesthetic view of the vehicle seat.

These and other objects and advantages of the present invention will become more readily apparent from the more detailed description of the preferred embodiment taken in conjunction with the drawings. Such objects and advantages are achieved by a structure of a vehicle seat comprising: a trim cover assembly having a lamination of a surface covering layer of an animal leather, a foam wadding and a wadding cover; and a foam padding covered with said trim cover assembly, said foam padding being formed into a configuration conforming to that of said seat by being formed in a mold such that a central seating part is defined on an upper surface of said padding in a manner being lower in level than other parts thereof, wherein said trim cover assembly is formed in a configuration conforming to that of said foam padding, having a central seating section corresponding to said central seating part of said foam padding wherein said central seating section of said trim cover assembly includes at least two separate base sections which are sewn together in such a manner that the resulting sewn central coating section lies upon and along said central part of said foam padding in conformity therewith, wherein said central seating section of said trim cover assembly is sewn with peripheral sections of the same assembly corresponding to said other parts of said foam wadding, wherein said animal leather surface covering layer is placed upon said padding without being bonded thereto, whereas said wadding cover is bonded integrally to said upper surface of said foam padding where it has said central seating part thereof defined inclusive, whereby there is no creation of wrinkle or crease on said trim cover assembly.

DETAILED DESCRIPTION OF PREFERRED EMBODIMENT OF THE INVENTION

Figure 1:
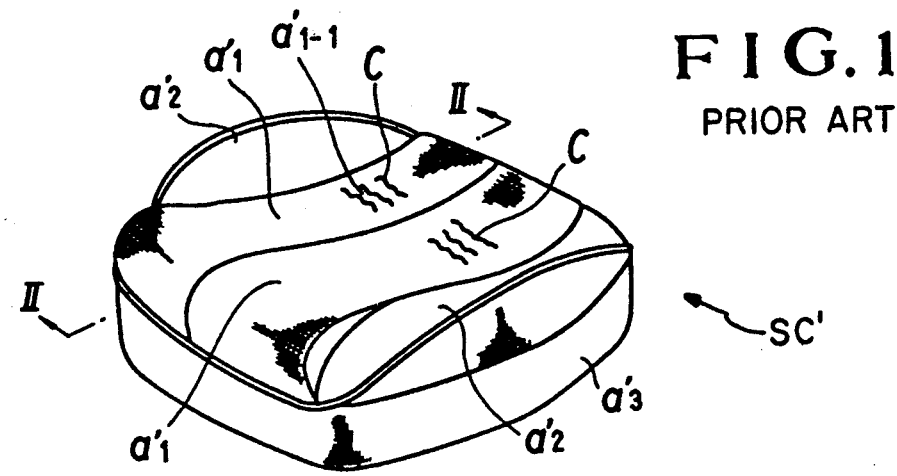
FIG. 1 is a perspective view of a conventional seat cushion whose trim cover assembly uses an animal leather surface covering layer.
Figure 2:
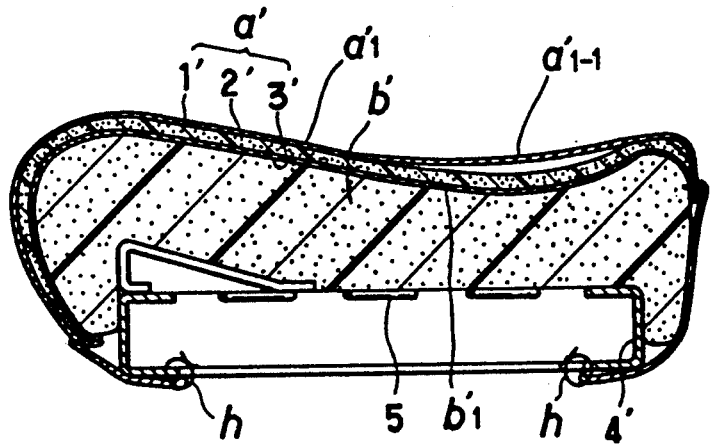
FIG. 2 is a sectional view taken along the line II—II in the FIG. 1.
Figure 3:
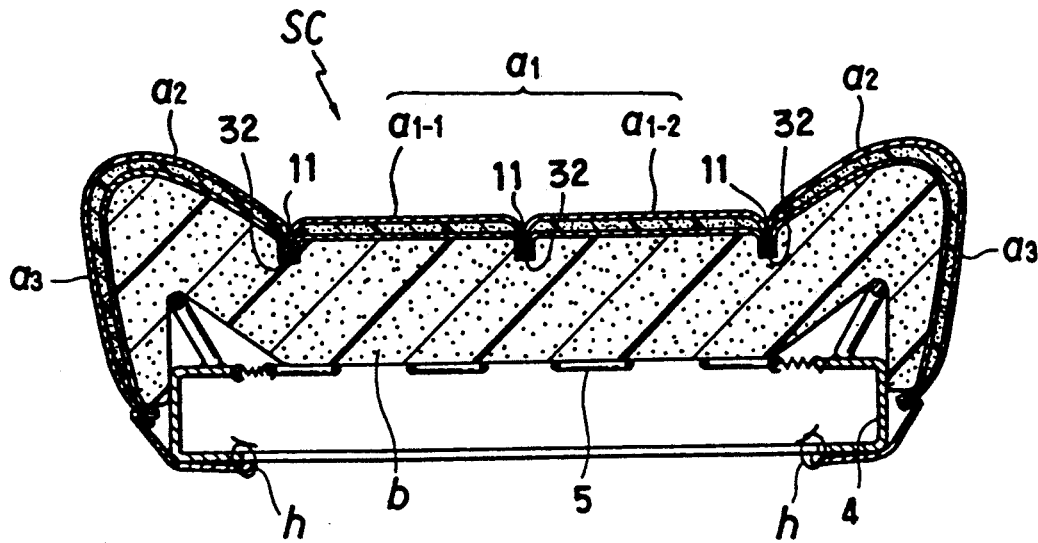
FIG. 3 is a sectional view of a seat cushion in accordance with the present invention.
Figure 4:
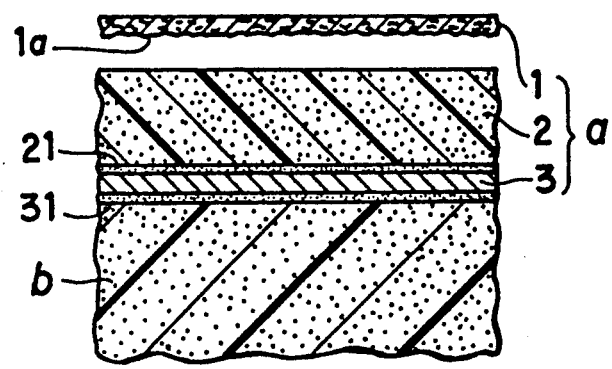
FIG. 4 is a partially enlarged sectional view taken from the FIG. 3.
Figure 5:
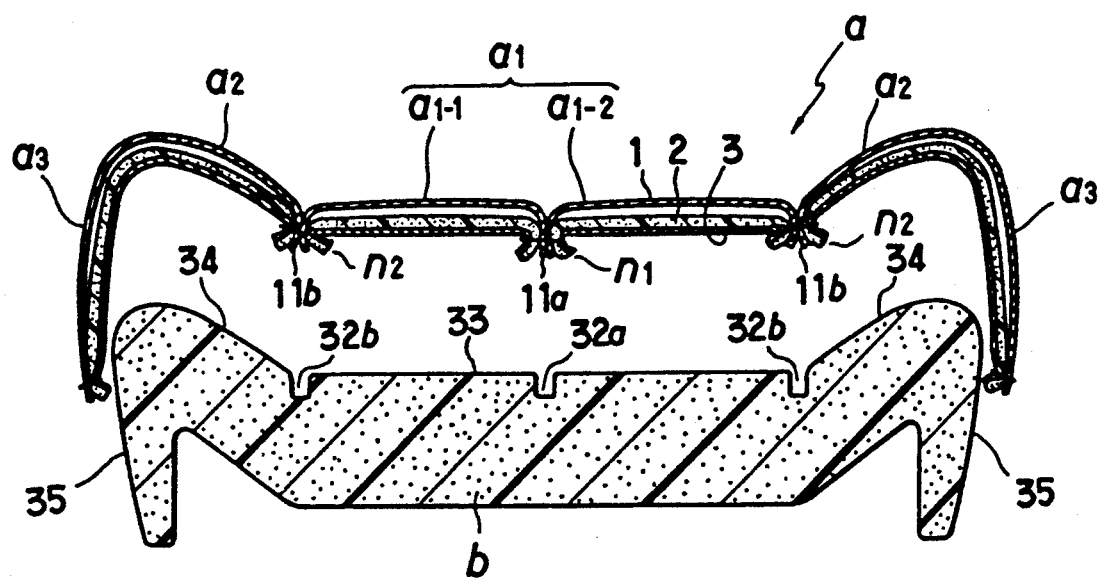
FIG. 5 is a sectional view of a seat cushion which shows the state where a trim cover assembly is to be bonded to a foam padding.

Referring to FIGS. 3 through 5, is illustrated a seat cushion (SC) in accordance with the present invention.

Similarly to the aforementioned prior-art seat cushion (SC'), a three-layer trim cover assembly (a) and a foam padding (b) are bonded together to form seat cushion (SC), and although not shown, a buttocks support dent area same with the one (b'1) of the prior-art padding (b') is formed in the foam padding (b) at its rearward portion. Specifically, referring now to FIGS. 4 and 5, the trim cover assembly (a) is basically formed into the illustrated configuration conforming to the upper surface of the seat back (SC) by sewing together a central seating section (a1) and a pair of side bolster sections (a2)(a2), wherein the latter section are raised relative to the former section, and a lateral wall section (a3) is defined continuously from each of the two side bolster sections (a2)(a2). The central seating section (a1) is formed by two independent basic parts (a1-1)(a1-2) which are sewn together at a central connected point (11a), defining a first sewn margin (n1) dependent from the reverse side of the section (a1). The free edges respectively of those connected basic parts (a1-1)(a1-2) are sewn with the inner edges of the two side bolster sections (a2)(a2), respectively, at the opposite connected points (11b)(11b) relative to the central connected point (11a), defining a pair of second sewn margins (n2)(n2) which are also dependent from the reverse side of the section (a1). Thus-formed trim cover assembly (a), as best seen from FIG. 4, is of a three-layer lamination structure comprising a surface covering layer (1) of an animal leather (e.g. a cattle leather), a foam wadding (2) (preferably made of an urethane foam slab material), and a wadding cover (3) (preferably an unwoven cloth), wherein the animal-leather layer (1) is not bonded to, but merely laid on the wadding foam (2), while the wadding foam (2) is bonded by an adhesive (21) to the wadding cover (3).

The foam padding (b) is formed into the illustrated configuration corresponding to a predetermined one of the seat cushion (SC) by being foamed in a mold: Namely, the foam padding (b) is so formed as to define therein a central seating part (33), a pair of raised bolster parts (34)(34) and a pair of lateral wall parts (35)(35), such that the central seating part (33) is low in level relative to the two raised bolster parts (34)(34). Centrally of the central seating part (33), there is formed an intermediate recessed groove (32a), and at the respective boundaries at (11b)(11b) between the central part (33) and bolster parts (34), are formed second recessed grooves (32b)(32b). Those three grooves (32a)(32b)(32b) are located in correspondence with the first sewn margin (n1) and (n2) (n2) and two second sew margins, respectively, so that those margins may be received precisely in the mating grooves. As shown in FIG. 3, the padding (b) is provided at its reverse recessed side with a frame (4) in which are extended plural sinuous springs (5).

As understandable from FIGS. 3 and 4, the trim cover assembly (a) is bonded at its wadding foam layer (3) by an adhesive (31) to the outer surfaces of the padding (b), with the three dependent margins (n1)(n2) (n2) being inserted and bonded in the respective recessed grooves (32a)(32b)(32b), and further securely anchored at its peripheral terminal ends to the frame (4) by means of hog rings (h).

Accordingly, the animal surface covering layer (1) is stretched neatly over the uneven surface of the seat back (SB), without being separated therefrom as opposed to the prior-art seat cushion (SC') and therefore, no unpleasant wrinkles or creases are created on the trim cover assembly (a), especially at the central seating section (a1) thereof lower in level relative to the two adjoining bolster sections (a2)(a2). Furthermore, the reverse skin side (1a) (see FIG. 4) of the animal-leather layer (1) is not bonded but merely placed upon the wadding (2), thereby maintaining a smooth surface of the layer (1) in contrast to the case where it is bonded by an adhesive to the wadding (2), resulting in a rough or grotesque textured patterns of the reverse skin side (1a) appearing on the outer surface of the layer (1). Still further, the surface covering layer (1) is at its both side terminal ends jointed by sewing to the lowest layer of the wadding cover (3) and inserted in the recessed grooves (32a)(32b)(32b), whereupon a uniform stretching of the layer (1) per se is positively made over the upper uneven surface of the seat back SB, which insures avoiding any creases or wrinkles thereon.

While a description has been made as above, it should be understood that the present invention is not limited to the illustrated embodiment, but other modifications, replacements and additions may be possible thereto without departing from the spirit and scope of the appended claims. For example, the central seating section (a1) of the trim cover assembly (a) may be comprised of more than two separate parts to thereby increase the connected points with a view to completely preventing wrinckle creation on its surface. With regard to the trim cover assembly (a), the foam wadding (2) is not necessarily bonded to the wadding cover (3) and may be merely placed thereon, since the foam wadding cover (3) is the essential layer to be bonded to the padding (b). Moreover, the present invention is also applied to a seat back of a vehicle seat, instead of the seat cushion (SC), and may find a good use in any other kinds of vehicle seats for aesthetical improvement purposes.

What is claimed is:

1. A structure of a vehicle seat comprising:
   a trim cover assembly comprising an animal-leather surface covering layer, a foam wadding and a wadding cover; and
   a foam padding covered with said trim cover assembly, said foam padding being formed into a configuration conforming to that of said seat by being formed in a mold such that a central seating part is defined on an upper surface of said padding in a manner being lower in level than other parts thereof, wherein said trim cover assembly is formed in a configuration conforming to that of said foam padding, having a central seating section corresponding to said central seating part of said foam padding, wherein said central seating section of said trim cover assembly includes at least two separate base sections which are sewn together in such a manner that the resulting sewn central section lies upon and along said central seating part of said foam padding in conformity therewith, wherein said central seating section of said trim cover assembly is sewn with peripheral sections of the same assembly corresponding to said other parts of said foam wadding, wherein said animal-leather surface covering layer is placed upon said foam padding without being bonded thereto, whereas said wadding cover is bonded integrally to said upper surface of said foam padding where it has said central seating part thereof defined inclusive, whereby there is no creation of wrinkle or crease on said trim cover assembly.

2. The structure as defined in claim 1, wherein a sewn margin is defined at a sewn connected point where said central seating section of said trim cover assembly is sewn with said other surrounding sections of the same, and wherein said upper surface of said foam padding is formed with a recessed groove, whereby said sewn margin is inserted and bonded by said adhesive into said recessed groove.

3. The structure as defined in claim 1, wherein said central seating section of said trim cover assembly comprises a plurality of independent basic parts said plurality of basic parts being sewn with one another at their respective ends in an integral way.

4. The structure as defined in claim 1, wherein said central seating part of said foam padding is formed with a buttocks support dent area at point rearwardly thereof, and wherein said central seating section of said trim cover assembly is bonded along said central seating part of said foam padding such that a rearward area of said trim cover assembly central seating section lies in conformity with said buttocks support dent area.

5. The structure as defined in claim 1, wherein said foam wadding is integrally bonded to said foam wadding cover by an adhesive.

6. The structure as defined in claim 1, wherein said foam wadding is placed on said wadding cover without being bonded thereto.

* * * * *